Figure 1:
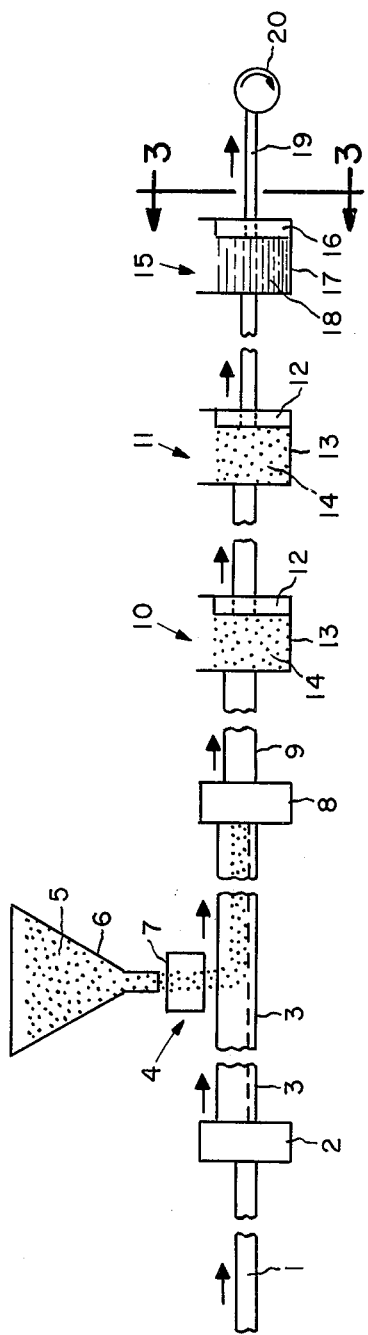

# United States Patent
Ballass et al.

[11] 3,935,414
[45] Jan. 27, 1976

[54] AUTOMATIC FIXED POSITION PIPE WELDING

[75] Inventors: John T. Ballass, Norwich; Richard A. Georgetti, Mystic, both of Conn.

[73] Assignee: Unicore, Inc., North Haven, Conn.

[22] Filed: Oct. 11, 1974

[21] Appl. No.: 514,196

[52] U.S. Cl. .............. 219/61; 148/24; 219/74; 219/146
[51] Int. Cl.² .............. B23K 31/06; B23K 35/22
[58] Field of Search .......... 148/24, 26; 219/74, 61, 219/137, 145, 146

[56] References Cited
UNITED STATES PATENTS

| | | | |
|---|---|---|---|
| 3,023,301 | 2/1962 | Claussen | 219/74 |
| 3,030,496 | 4/1962 | Cotter et al. | 219/145 |
| 3,177,340 | 4/1965 | Danhier | 219/146 |
| 3,405,250 | 10/1968 | Lee | 219/146 |
| 3,424,892 | 1/1969 | Wilcox | 219/146 X |
| 3,580,748 | 5/1971 | Delong | 148/26 |
| 3,700,494 | 10/1972 | Avallone | 219/146 X |
| 3,848,109 | 11/1974 | Zvanut | 219/146 |

Primary Examiner—J. V. Truhe
Assistant Examiner—N. D. Herkamp

[57] ABSTRACT

Automatic fixed position pipe welding is carried out by gas-shielded electric arc welding with a novel flux-cored electrode wire having a low-carbon sheel sheath containing a core filling of, by weight, 16–17 percent ferro manganese, 10–11 percent ferro silicon, 1–4 percent manganous oxide, ½–1 percent potassium aluminum fluoride, and the balance rutile. The wire exterior is shiny and metallic-appearing, and the wire is configured to have folded-in edges.

6 Claims, 3 Drawing Figures

U.S. Patent  Jan. 27, 1976  3,935,414

AUTOMATIC FIXED POSITION PIPE WELDING

This application is related to our concurrently-filed copending application, Ser. No. 514,195, which latter is a continuation-in-part of an earlier-filed copending application, Ser. No. 250,240, filed May 4, 1972 (now abandoned), which in turn is a continuation-in-part of a still earlier patent application, Ser. No. 53,016, filed July 7, 1970 (now abandoned).

This invention relates to the automatic electric arc welding of fixed-position pipes using flux-cored wire electrodes.

Fluid-carrying pipelines are often constructed by arc welding together strings of pipe sections directly at the installation site. Automatic welding is advantageously applied when the pipe sections can be rotated past stationary electode holders, but when the pipe confurations due to size or complexity do not make this practical or possible efforts have been expended to develop suitable automatic welding apparatus wherein the pipe sections or workpieces can be maintained in fixed-position, while a mechanism moves the electrode holder or holders around the circumference of the annular joint. Such mechanisms are known in which plural electrode holders encircle the fixed joint depositing weld metal in the joint in one or more passes. In some instances, the electrode holders are made to travel in opposite directions to deposit weld metal over equal or unequal arc segments of the circular joint dependent upon the particular apparatus design. No matter what the design, throughout a large part of the circular path so-called out-of-position welding is employed, i.e., the weld puddle is in a vertical or overhead position with regard to the electrode, rather than in the simpler flat or horizontal position. To effectuate sound out-of-position welds requires careful control of the weld puddle fluidity and fast freezing to avoid puddle drip or loss. The situation is aggravated by the fact that the preferred technique, to save time, is to use the same electrode for the entire circumferential weld. This requires an electrode construction capable of making satisfactory welds in all positions, that is, flat, horizontal, vertical and overhead. Moreover, to simplify the apparatus, it is desirable that it not be necessary to alter the welding conditions, such as electrode-workpiece spacing, voltage, current, shielding gas flow rate, electrode feed rate through the holder, or electrode travel speed around the workpiece, during the time the elelectrode or electrodes traverse or encircle the fixed joint. This places additional severe requirements on an appropriate wire electrode construction capable of satisfactory performance under such a variety of welding conditions.

A further complication is present in those instances where the pipes are to be installed in locations where they will be subjected to subzero temperature environments. The welded joints of pipes in this severe environment must satisfy requirements not only of good tensile strength but also of high notch toughness (ability to withstand impacts at a stress-concentrating notched section, usually measured by Charpy V Notch Values [CPV] in a standard test at various temperatures).

Our invention is a flux-cored electrode wire that has proved itself unusually well suited for use in automatic welding of fixed-position pipe sections wherein the electode holder or holders traverse part or all of a circumferential path involving horizontal, vertical and overhead positioning of the weld puddle without altering the welding conditions during the traverse and capable of producing sound, reliable welds characterized by good tensile strength and high notch toughness at subzero temperatures. In accordance with our invention, the flux-cored electrode wire comprises a steel sheath of low carbon content which contains within its core a novel fluxing and alloying welding mixture comprising a low content of deoxidizing, steel hardening agents, a small critical amount of a fluoride, a small critical amount of manganous oxide, and a high content of rutile. More specifically, the novel welding mixture comprises, by weight of the mixture, 16–17 percent of ferro manganese, 10–11 percent of ferro silicon, 1–4 percent of manganous oxide, $\frac{1}{2}$–1 percent of a fluoride added as potassium aluminum fluoride, and the balance rutile. The core mixture constitutes 14–17 percent by weight of the completed electrode wire. Our novel electrode wire is intended for welding mild and low alloy steels in a gas-shielded arc welding process, that is, under the protection of a conventional shielding gas, such as $CO_2$, a, $CO_2$+A mixtures, and He, with $CO_2$+A preferred as the shielding gas.

In accordance with a further feature of our invention, the welding mixture is incorporated in a sheath having a configuration in which the sheath edges at the seam are folded inward to contact one another over extended outer surface portions of the sheath edges, and the sheath exterior surface is characterized by a shiny and metallic appearance due to the absence of baking following the final drawing operation through lubricated dies.

We do not fully understand the unique coaction that is present between the various substances present in our completed electrode wire, but we believe the following explanation, which is not intended to be limiting, may account for the unusually good performance of our novel flux-cored electrode in automatic fixed-position pipe welding by gas-shielded electric arc welding.

In the manufacture of conventional flux-cored welding wire, it is known to introduce the flux and alloying ingredients or welding mixture within the core of a hollow steel sheath, and draw down the sheath to a small diameter by pulling same through lubricated drawing dies. To remove drawing compound residues on the completed wire, and to remove any entrained moisture, it is conventional to bake the completed wire. A typical baking cycle is 4 hours at 600°F. The appearance of the wire, which is shiny and metallic prior to baking, changes to a characteristic dull, dark look indicative of the presence of a thin oxide coating on the steel sheath. This oxide coating interferes with establishing a good, solid electrical connection from the holder to the wire electrode during continuous feeding of the wire electrode in automatic welding. The drawing operation cannot be avoided, because it is essential for automatic welding, especially allposition automatic welding, that the wire electrode exhibit high uniformity, dense packing of the core material, and be free of voids, in the absence of which it will not be possible to establish a smooth continuous flow of current and uniformity of deposition rate and efficiency, essential requisites for automatic welding. These considerations accent the need for multiple drawing operations to ensure a dense, uniform, thorough packing of the core mixture.

Thus, the completed wire electrode that emerges from the final drawing stage will have on its surface drawing compound residues and exhibit a shiny, smooth, metallic appearance. Contrary to the earlier practice, we do not bake the wire to remove the drawing compound residues and any moisture present, because of the inevitable thin oxide coat that results. With our unbaked wire in the as-drawn condition, we find continuous electrical conductivity from the holder contact tip to the electrode surface is established even as the wire is continuously fed through the electrode holder providing a smooth continuous flow of current from the contact tip to the wire surface to initiate and maintain continuous welding. However, these drawing compound residues present on the wire can interfere with obtaining a sound weldment. It is our belief that the small amount of fluoride present as well as the manganous oxide in the ranges indicated above prevent any detrimental effects of these drawing compound residues.

To achieve good tensile strength and high notch toughness at subzero temperatures, we use a sheath steel whose carbon content is maintained low, below 0.1 percent. In addition, we also maintain the content of the ferro manganese and ferro silicon relatively low. The ferro manganese and ferro silicon are well known deoxidizers, but also act as alloying, hardening agents for the weld. Keeping the latter content low, however, increases the possibility of insufficient deoxidizing action, with the result of unsound, porous weldments. We believe that the high rutile content which is the primary slag-former, the manganous oxide, and the fluoride, which may function as a super-deoxidizer, all contribute to keeping oxygen out of the weld puddle or tying it up before it can combine with the carbon present to generate gas. Moreover, it is essential that the welding be carried out under the protection of a conventional shielding gas, such as carbon dioxide.

Still further, for out-of-position welding, where low puddle fluidity and fast-freezing is essential, it is essential that the fluoride content be maintained small within the range of ½–1 percent. In this case, we prefer to use as our fluoride, potassium aluminum fluoride. As a result of the foregoing, we find that welds made with our electrode wire exhibit very high notch toughness at subzero temperatures, while retaining satisfactory tensile strength.

Figure 2:
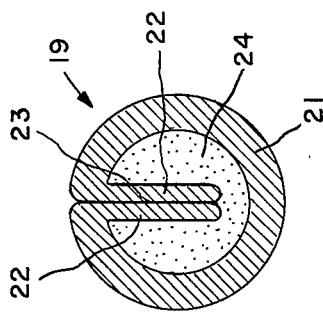
Figure 3:

The following examples are illustrative of our invention but not limiting thereof, reference being made to the accompanying drawing wherein:

FIG. 1 schematically illustrates one method of making a flux-cored electrode wire in accordance with our invention;

FIG. 2 is a schematic, side view of the sheath at the flux mixture filling state, FIG. 3 is a cross-sectional view of the completed electrode wire of our invention.

To make up the welding mixture, the starting ingredients (rutile, ferro manganese, fero silicon, manganous oxide, and the fluoride) in the proportions desired (examples given in the table following below) are ground, screened to a mesh size between 50–325 mesh, and thoroughly mixed. The wire sheathing, obtained in strip form, is of plain carbon steel. A preferred composition is AISI 1008 (whose maximum carbon content is 0.10 percent) though other low carbon types such as AISI 1010 (max. carbon content 0.13 percent), AISI 1006 (max. carbon content 0.08 percent, and AISI 1005 (max. carbon content 0.06 percent) are suitable. Either rimmed or killed steel can be used, but we prefer rimmed steel as it appears to give better results, and is also less expensive. The strip, designated 1 in FIG. 1, is initially passed through contour-forming dies 2 to form a generally U-shaped configuration or trough 3, into which the dry finely-powdered welding mixture (no binder is used) is introduced in measured amounts to constitute 14–17 percent by weight of the completed electrode.

The introduction stage is shown at 4 in FIG. 1, and in more detail in a schematic side view in FIG. 2. The finely-powdered welding mixture 5 is provided in a hopper 6 from which it is dispensed onto the top surface of a continuous moving belt 7 which carries the powdered mixture over and into the open ends of the sheath trough 3. The belt speed and hopper dispensing rate, together with the strip 1 feed rate, are readily controlled to provide a uniform filling of the strip trough within the weight percentages desired. The open end of the U-strip is then closed tight by forming dies, as shown at 8, to form a sheath configuration 9 in which the edges rather than just abut are folded inward to contact one another over extended areas of the outer edge surfaces to make for a tighter seam with less risk of drawing compound entrapment (since no baking step is used to remove any entrapped compound or moisture), and to improve the electrical contact and uniformity of current distribution over the wire cross-section of the finished electrode. Though FIG. 3 is a cross-section of the finished electrode, it can also be regarded as a reasonably accurate view of the electrode wire cross-section at the completion of the filling operation and closing of the sheath prior to drawing, though of course the wire diameter at this stage, prior to drawing, is approximately three times larger than the finished wire diameter. Following the filling and closing operation, the flux-filled wire is drawn through a series of drawing dies to the finished wire diameter, conventional drawing compounds being used to lubricate the wire.

At 10 and 11 are shown two initial drawing stages comprising dies 12 before which is located a lubricant holder 13 which contains lubricant 14 through which the wire is drawn just before entering the dies 12. We prefer to use during the initial drawing stages where the major size reduction occurs standard dry stearate-type drawing compounds 14, which is basically fatty acids and their salts containing C, H and O. However, for the final drawing stage to finished wire diameter, shown schematically at 15, with die 16 and lubricant holder 17, we prefer to use a conventional, synthethic, water-base wax drawing compound 18 in a wet (paste) condition. We believe the latter removes some of the stearate residues from the earlier drawing stages, though both dry stearate and wax residues remain on the exterior surfaces of the finished wire. The resultant wire 19 is wound up into a continuous coil or onto spools 20 and sold to the user in the as-drawn condition without subsequent cleaning, polishing or baking steps, thus reducing the manufacturing cost considerably.

The cross-section of the finished wire 19 is depicted in FIG. 3. Reference numeral 21 designates the plain carbon sheath whose edges, designated 22, are folded in so as to contact one another over extended outer surface areas, shown at 23. The compacted welding mixture in the core is designated 24.

Weld tests were performed with 1/16 inch and 0.052 inch diameter wires of our invention at 220 and 180 Amperes, respectively, at 25–26 volts with a shielding gas coverage of 75 argon plus 25 carbon dioxide at 35–45 cfh. In Table I are reported results on depositing butt welds on ASTM A36 structural steel with various surface conditions, such as "as received" from the mill, i.e., having mill scale surfaces. The table sets forth various flux compositions in weight percent of the welding mixture of the wire electrode.

TABLE I

| Flux Example No. | 1 | 2 | 3 |
| --- | --- | --- | --- |
| Ferro Manganese | 17 | 16 | 17 |
| Ferro Silicon | 11 | 10 | 11 |
| Rutile | 69.25 | 71.5 | 67.5 |
| Manganous oxide | 2.0 | 2.0 | 4.0 |
| Potassium aluminum Fluoride | 0.75 | 0.5 | 0.5 |
| Tensile Strength, psi | 85,700 | 93,400 | 86,200 |
| Yield Strength, psi | 76,800 | 82,500 | 75,500 |
| Elongation, % | 28.5 | 25.5 | 28.5 |
| CPV Toughness, Ft-lbs. at 0° F | 70.8 | 36.8 | 58.0 |
| " −20° F | 55.7 | 26.3 | 38.8 |
| " −50° F | 52 | | |

In the examples of Table I, the core content ranged between 14–17 percent by weight of the electrode wire. In all instances it was found that the welds were sound, free of porosity, and exhibited excellent mechanical properties, especially high notch toughness at sub-zero temperatures. Moreover, the pipe welding which included an out-of-place welding operation was easy to carry out and involved fewer difficulties than when using the known flux compositions, especially in maintaining stability of the puddle and fast freezing thus avoiding puddle drip and loss.

summarizing, our novel electrode wire for the application described above offers the following advantages:

1. the shiny, metallic-appearing exterior surface of the wire permits good electrical contact to be maintained at all times, 2. the flux mixture non-hygroscopic, and whatever drawing compound residues that remain prevent corrosion of the exterior surface, affording long shelf life, 3. the physical characteristics of the wire are outstanding, as the core material is densely packed, the mechanical confinement is excellent, and no flux voids are encountered, resulting in a smooth, continuous, and well distributed current flow at all times, 4. sound reproducible welds having excellent mechanical properties, such as good strength, high notch toughness at subzero temperatures, and good appearance are easily obtained, 5. fixed position pipe welding is readily accomplished to yield sound welds with good mechanical properties, 6. deposition rates and efficiency are high and the resultant slag is easily removed.

While our invention has been described in connection with specific embodiments thereof, those skilled in the art will recognize that various modifications are possible within the principles enunciated herein and thus the present invention is not to be limited to the specific embodiments disclosed.

What is claimed is:

1. A flux-cored electrode wire for use in gas-shielded electric arc welding of fixed position pipes comprising a drawn steel sheath having a core and a welding mixture contained within the core and constituting 14 percent –17 percent by weight of the wire, said welding mixture consisting essentially of, by weight of said mixture, 16–17 percent ferro manganese, 10–11 percent ferro silicon, 1–4 percent manganous oxide, ½–1 percent of potassium aluminum fluoride, and the balance rutile, the sheath exterior surface being shiny and metallic-appearing with unremoved drawing compound residues.

2. A flux cored electrode wire as claimed in claim 1 wherein the steel sheath has a carbon content below 0.1 percent, and a configuration wherein the sheath edges are folded inward to contact each other over extended areas of their exterior surfaces.

3. A flux-cored electrode wire as claimed in claim 2 wherein the welding mixture consists essentially of 17 percent ferro manganese, 11 percent ferro silicon, 2 percent manganous oxide, 0.75 percent of the fluoride, and the balance rutile.

4. A flux-cored electrode wire as claimed in claim 2 in which the welding mixture consists essentially of 16 percent ferro manganese, 10 percent ferro silicon, 2 percent manganous oxide, 0.5 percent potassium aluminum fluoride, and the balance rutile.

5. A method of fixed position welding of steel pipes by establishing an electric arc between the steel pipes and an electrode wire as claimed in claim 1 while passing a shielding gas around the arc.

6. A flux-cored electrode wire for use in gas-shielded, automatic fixed-position pipe, electric-arc welding comprising a low carbon steel sheath having a core and a welding mixture contained in the core and constituting 14 percent – 17 percent by weight of the wire, said welding mixture consisting essentially, by weight of said mixture, of 16–17 percent ferro manganese, 10–11 percent ferro silicon, 1–4 percent manganous oxide, ½–1 percent of potassium aluminum fluoride, and the balance rutile.

* * * * *